E. T. WILLIAMS.
ICE MAKING AND HARVESTING APPARATUS.
APPLICATION FILED JAN. 22, 1914.
1,149,009.
Patented Aug. 3, 1915.
2 SHEETS—SHEET 2.
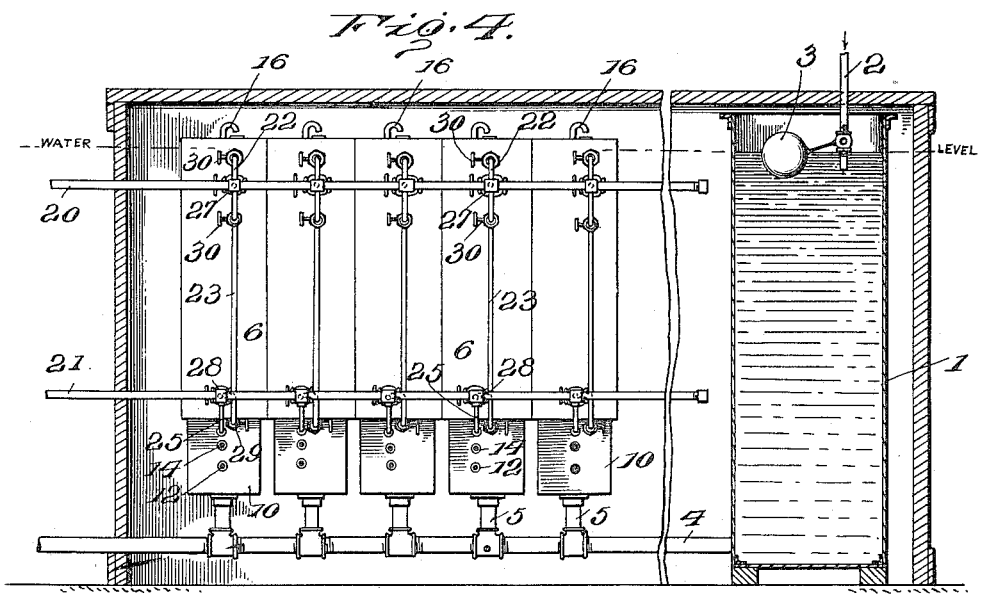
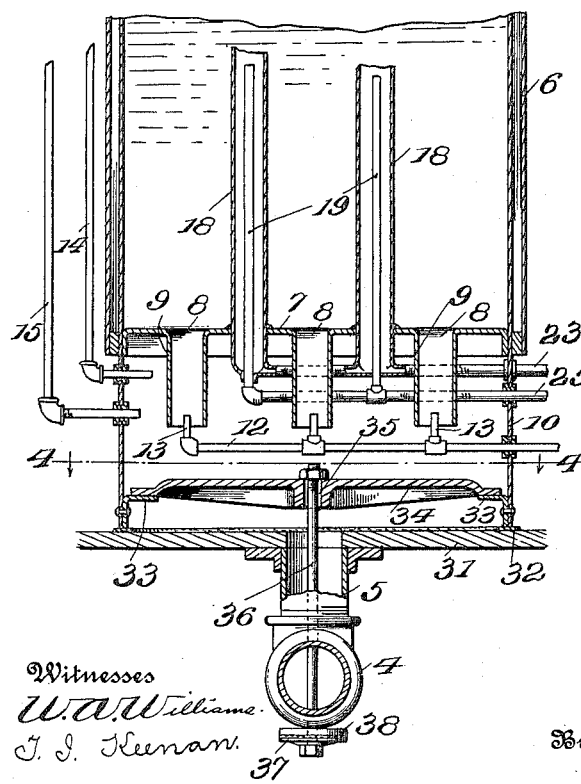
Witnesses
W. A. Williams
J. J. Keenan
Inventor
Edward T. Williams
By Robertson & Johnson
Attorneys

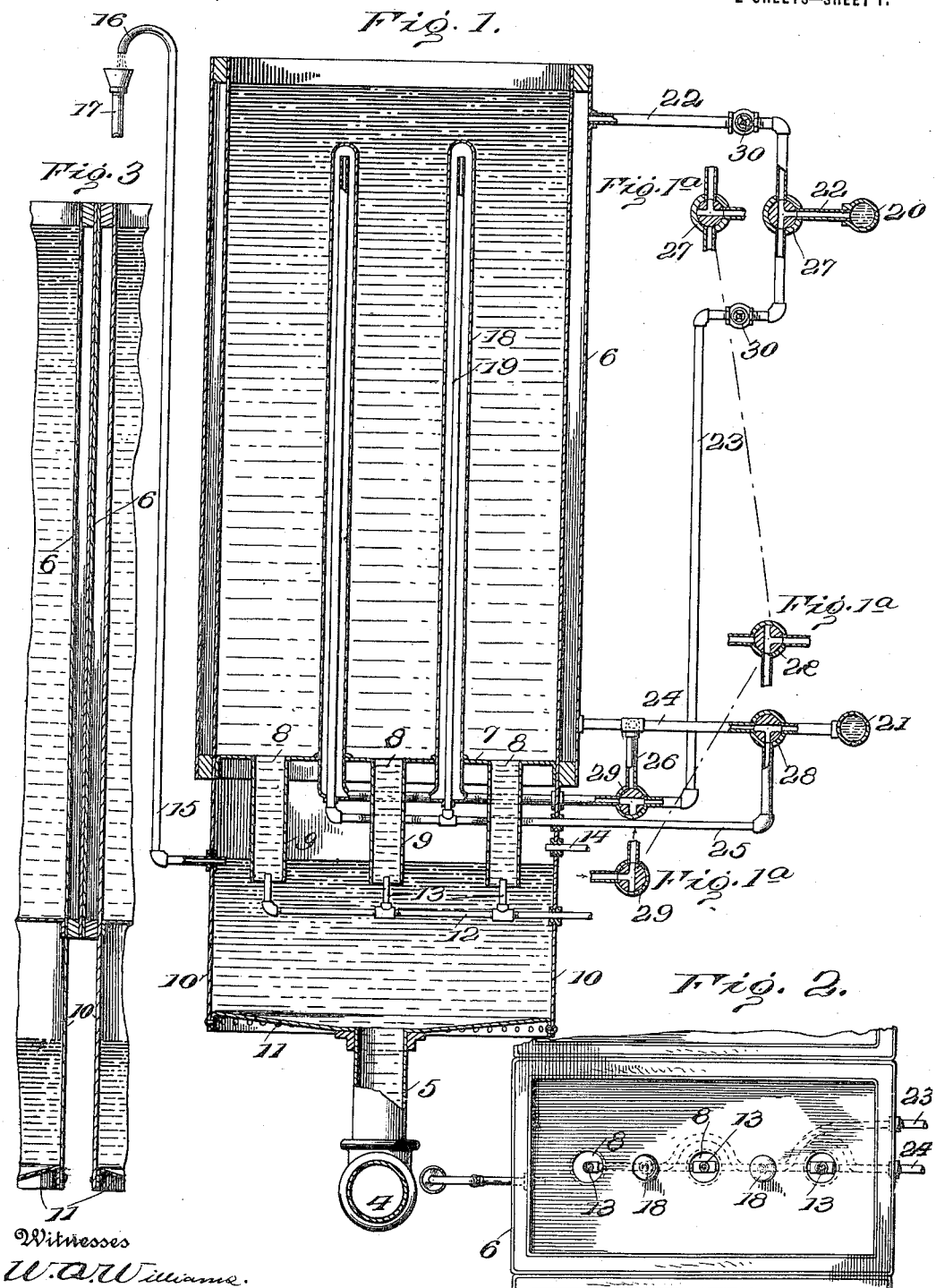

UNITED STATES PATENT OFFICE.

EDWARD T. WILLIAMS, OF BROOKLYN, NEW YORK.

ICE MAKING AND HARVESTING APPARATUS.

1,149,009.  Specification of Letters Patent.  Patented Aug. 3, 1915.

Application filed January 22, 1914. Serial No. 813,720.

*To all whom it may concern:*

Be it known that I, EDWARD T. WILLIAMS, a citizen of the United States of America, and a resident of Brooklyn, in the county of Kings and State of New York, have invented certain new and useful Improvements in Ice Making and Harvesting Apparatus, of which the following is a specification.

My invention relates to ice freezing and harvesting apparatus of the type shown in my Patents Nos. 1,051,296 to 1,051,300 inclusive, the general arrangement resembling more particularly that of Patents Nos. 1,051,298 and 1,051,299 although the apparatus differs very distinctly from that of these patents.

The object of my invention is to increase the capacity of an installation of a given size, or to cut down the size of installations necessary to produce a specified output, this object being accomplished by making certain changes in mold construction and in the means by which the freezing and thawing fluid is made effective. In accomplishing this object, instead of using a single shallow tank for all the molds I use a plurality of tanks and preferably provide each mold with its own individual water tank, I also prefer to employ interior freezing columns in conjunction with freezing and thawing means surrounding the molds as in my patents above referred to. I have also provided an efficient mode of variable connection for the various freezing means, and have devised means for releasing excess air introduced into the open-bottomed air pocket or auxiliary thawing chamber underneath the upper bottom of the mold. This and other features of my invention will appear more clearly hereinafter and will be more particularly set forth in the appended claims.

Figure 1 is a vertical section through one of the molds and connected parts. Fig. 1ª is a detail cross section illustrating a position of the three-way controlling valves different from that illustrated in Fig. 1. Fig. 2 is a plan view showing a mold and parts of adjacent molds. Fig. 3 is an incomplete vertical section through adjacent molds showing their relative arrangement. Fig. 4 is an end elevation of a battery of molds and the supply tank. Fig. 5 is a detail vertical section of a modified form of mold and Fig. 6 is a section on the line 4—4 of Fig. 5.

Referring to Figs. 1 to 4, the main feed water tank or stand pipe 1 receiving water automatically to the desired level through feed pipe 2 governed by float valve 3 is connected by header 4 with the individual molds at their bottom by branch pipes 5 which, as will hereinafter be seen, serve both as water inlets and as drainage outlets. The molds are supported by the branch pipes 5 on the water headers 4, but they might be supported in some other suitable way.

As in my prior patents referred to I provide means for holding water beneath the bottoms of the molds and for separating it therefrom by space, but in contradistinction to the construction of the said patents, I employ a plurality of tanks for holding water in the form preferred and herein illustrated each mold is provided with freezing and thawing jackets 6 and has a transverse upper bottom 7 provided with a hole or holes 8 each surrounded by a depending pipe or shell 9 which, as in the molds of my said patents, provides with the wall 10 which depends from the bottom of the mold open-bottomed air trapping pockets which constitute auxiliary thawing chambers. In the molds illustrated in this application, however, the wall 10 is extended down some distance and the mold is provided with a second or lower bottom 11, which as in the form illustrated in Fig. 1, may slope inward and downward to the inlet and outlet which I prefer to arrange centrally. It will be seen that an individual water tank is thus provided in the bottom of each mold auxiliary to the main feed or stand pipe 1 and underlying the upper bottom 7. The open-bottomed air pocket is water sealed as in my former apparatus, but in this case by the water in the individual tank. Agitating air is introduced through pipe 12. This pipe, where I provide several openings with their depending shells 9, has a delivery nozzle 13 for each such shell. Means is provided for heating the space beneath the bottoms and I have illustrated means for introducing thawing air through the pipe 14 into the auxiliary thawing air pocket and for removing excess thawing or other air by the outlet air pipe 15, which extends up above the level of the water in the molds and returning as at 16 permits the escape of excess air and delivers to the drainage pipe 17 any water which may have been forced out of the air pocket. Rapidity of operation is greatly promoted by association with the freezing and thawing jackets 6 of internal freezing and thawing columns which extend up within the molds and are located between the holes in the bottom. These freezing and thawing columns have external pipes 18 and internal pipes 19 freezing and thawing fluid being supplied through one of said pipes and returned through the other. Various well known means for heating and cooling the freezing and thawing fluid and for handling it may be employed. I have illustrated merely headers 20—21 either of which may be the supply header and the other the return header and to which may be supplied cold brine or hot brine as occasion demands. From the header 20 a pipe 22 leads to the freezing and thawing jacket 6 and a branch pipe 23 leads from the pipe 22 into the air pocket at the bottom of the mold and connects with the external pipes 18 of the freezing and thawing columns. A pipe 24 connects the header 21 with the freezing and thawing jacket 6 and a branch pipe 25 connects said pipe with the internal pipes 19 of the freezing and thawing columns these being illustrated as in multiple with each other. There is also a connection 26 between the pipe 23 and the pipe 24. In the connections just described are located three-way valves as follows: valve 27 governing pipes 22 and 23; valve 28 governing pipes 24—25 and valve 29 governing pipes 23—24. In the position which these valves occupy in Fig. 1, it will be apparent that the freezing and thawing jackets and the freezing and thawing columns are connected in multiple with the headers 20—21, whereas with the valves in the position shown in Fig. 1ª said jackets and columns are in series. Handvalves 30 may be provided for adjusting the flow when the system is operating in multiple. It will be apparent that with the multiple arrangement it is possible to adjust the relative amounts of fluid passing to the different freezing means and this is especially useful in the thawing operation. It would of course be possible to have a supply and return system for the freezing and thawing jackets and a separate supply and return system for the internal freezing and thawing columns. It would likewise be possible to have a series arrangement only, or a multiple arrangement only, and with any of these arrangements the columns might be connected in series or in multiple with each other. The mode of connection illustrated is, however, preferred. As illustrated the freezing and thawing columns extend through the bottom and the connections by which they are served are located in the air pocket which is a very advantageous arrangement since there is no water there to form ice, the air space acting as insulation. Where the freezing and thawing jackets are external the jackets of adjacent molds may be arranged in juxta-position thus spacing apart the water tanks formed in the bottom of each mold, providing a space for circulation of air and avoiding the danger of freezing at a point where this is not desirable. It will be noted that the header 4 is comparatively large as are also the connections 5 thus insuring the prompt filling of the molds. The drainage apparatus may be similar to that shown in my Patent No. 1,051,298 and therefore need not be detailed here no claim being made to it in this application.

Referring to the modification illustrated in Figs. 5 and 6, it will be noted that the various parts which have already been described in connection with Figs. 1 to 4 are designated by the same numerals. They need not be further described. This mold differs from the mold illustrated in the other figures in that it is removable from its lower bottom 31, which may be in the nature of a platform constituting the bottom of a number of molds and supported in any suitable way. The lower edge of the extended wall 10 of each mold rests on a strip 32 of rubber or other suitable packing, and the mold is retained in proper position, a watertight joint being secured by means of said packing through clamping instrumentalities now to be described. On opposite sides of the depending wall 10 are located lugs 33 with the upper faces of which a cross bar 34 coacts. This bar has a central hole 35, through which passes a bolt 36, which extends down through the connection 5 and the header 4 and through a block 37 covered with packing 38 which prevents leakage where the bolt passes through the under side of the header. It will be understood that with this arrangement, the individual molds may be removed from the bottoms 31.

What I claim as my invention is:

1. Ice making apparatus comprising in combination, a water supply, a plurality of freezing molds each having a transverse bottom having a hole therein and a second bottom below the first forming with the mold walls an individual auxiliary feed water tank underlying said transverse bottom and in communication with the interior of the mold through said hole, and means for connecting said individual water tanks to said water supply.

2. Ice making apparatus comprising in combination, a water supply, a plurality of upright freezing molds each having in its bottom an individual auxiliary feed water tank of substantially the horizontal cross section of the mold, each of said tanks being in communication with the interior of its mold, and means for connecting said individual tanks to said water supply.

3. Ice making apparatus comprising in combination, a water supply, a plurality of freezing molds located in the atmosphere each having in its bottom an individual water tank and air trapping means open to said tank, and connections between said individual tanks and said water supply.

5. In ice making apparatus, a freezing mold having a transverse bottom provided with a hole and having below said transverse bottom an individual water tank underlying said bottom and providing also space for gas, as air, between the surface of the water in said tank and said bottom, and a pipe or shell surrounding said hole and passing from a point beneath the water level through said space to the bottom of the mold.

5. In ice making apparatus, a freezing mold having in its bottom a water tank and an open-bottomed air pocket above the same and open thereto.

6. In ice making apparatus, a freezing mold having two bottoms spaced widely apart and forming with the mold walls a chamber constituting a water tank and a downwardly facing open-bottomed air pocket above said tank and open thereto.

7. In ice making apparatus, a mold having a transverse bottom provided with a hole surrounded by an open ended shell depending from said bottom and having also a wall depending from said bottom and inclosing said shell to form an open-bottomed air trapping pocket below said transverse bottom between the depending shell and wall and having also a second bottom below the lower end of said depending shell and forming with said wall a water tank.

8. In ice making apparatus, a freezing mold provided with freezing and thawing means and with two bottoms spaced apart, the upper bottom being provided with a hole and having a depending shell surrounding the same, the chamber between the two bottoms constituting an open-bottomed air trapping pocket beneath the upper bottom and a water tank located below said air trapping pocket and in communication with the interior of the mold, said air trapping pocket being provided with an air inlet and said water tank being provided with a water inlet.

9. In ice making apparatus, a freezing mold provided with freezing and thawing means and with two bottoms spaced apart, the upper bottom being provided with a plurality of holes and having a depending shell surrounding each hole and an air inlet for each shell, the chamber between the two bottoms constituting an open-bottomed air trapping pocket beneath the upper bottom, and a water tank located below said air trapping pocket and in communication with the interior of the mold through said shells, said air trapping pockets being provided with an air inlet.

10. In ice making apparatus, a mold having a transverse bottom provided with a hole surrounded by a depending shell, a wall extending down from said bottom and forming with said transverse bottom and shell an open-bottomed air pocket, an interior freezing column within the mold, and a pipe in said air pocket for serving said column.

11. In ice making apparatus, a mold having a transverse bottom provided with a hole surrounded by a depending shell, a depending wall forming with said bottom and shell an open-bottomed air pocket, an interior freezing column within the mold, pipes within said pocket for serving said freezing column, and a pipe for delivering air to said pocket.

12. In ice making apparatus, a mold provided with freezing and thawing means and having a transverse bottom provided with a plurality of holes each surrounded by a depending shell, a wall extending down from the said bottom and forming with said transverse bottom and shells an open-bottomed air pocket below said bottom, interior freezing columns between said holes, pipes in said air pockets for serving said freezing and thawing columns, and devices for delivering agitating air within each of said shells.

13. Ice making apparatus comprising in combination, a water supply, a plurality of molds in communication therewith and having in their bottoms individual water tanks and open-bottomed air pockets above said individual tanks and opening thereon, interior freezing and thawing columns within the molds, and pipes for serving said columns located in said pockets.

14. Ice making apparatus, comprising in combination, a common water supply, upright freezing molds open at the top and in communication at the bottom with said water supply, freezing and thawing means surrounding said molds, interior freezing columns extending up through each mold, and means for serving said surrounding freezing and thawing means and said interior freezing columns with the freezing and thawing fluid.

15. Ice making apparatus, comprising in combination, a water supply, a plurality of molds in communication therewith at the bottom, said molds having transverse bottoms provided with holes surrounded by depending shells, said bottom, said bottom shells and the depending wall of a given mold constituting an open-bottomed air pocket, interior freezing and thawing columns within the mold, headers for serving freezing and thawing fluid and connections between said headers and said columns, part of which are within said air pocket.

16. Ice making apparatus comprising in combination, a plurality of freezing molds provided with freezing and thawing jackets and having interior freezing columns, headers for supplying and returning freezing and thawing fluid, and series connections between one of said headers, said jacket, the interior freezing column and the other header.

17. Ice making apparatus comprising in combination, a plurality of freezing molds provided with freezing and thawing jackets and having interior freezing columns, headers for supplying and returning freezing and thawing fluid, connections between said headers, jackets and columns including series and multiple connections between said jacket and said interior freezing column, and valves in said connections for utilizing either of these arrangements.

18. In ice making apparatus, a plurality of molds having exterior freezing and thawing jackets and located with adjacent sides of said jackets in juxtaposition, said molds being each provided with a transverse bottom adjacent the lower end of said freezing and thawing jackets and with a second bottom below the first and having depending inner walls connecting said bottoms and forming an individual water tank for each mold.

19. Ice making apparatus comprising in combination, a water supply, a plurality of upright freezing molds open at the top and in communication at the bottom with said water supply, freezing and thawing means for said molds, each of said molds having a transverse bottom provided with a hole surrounded by a depending shell and with a depending wall surrounding said shell, means for delivering thawing air to the air pocket formed by said bottom, wall and shell, and an outlet pipe leading from said air pocket at a point above the bottom of the shell and extending up above the top of the mold to permit the escape of excess air.

20. Ice making apparatus comprising in combination, a water supply, a plurality of upright freezing molds open at the top and in communication at the bottom with said source of supply, freezing and thawing means for said molds, each of said molds having a transverse bottom provided with a hole surrounded by a depending shell and with a depending wall surrounding said shell, a second bottom below the first, means for delivering thawing air to the air pocket formed by said upper bottom, wall and shell, and an outlet pipe leading from the space between the bottoms of the mold at a point above the bottom of the shell and extending up above the top of the mold to permit the escape of excess air.

21. Ice making apparatus comprising in combination, a plurality of upright molds, freezing and thawing means for said molds, said molds having transverse bottoms having holes surrounded with depending shells and having a second bottom below the first, the bottoms of a plurality of said molds being joined and constituting a platform, a water supply header, connections therewith delivering water through said platform to the bottoms of the molds, and means for clamping each mold to said platform.

22. Ice making apparatus comprising in combination, a plurality of removable upright molds, freezing and thawing means for said molds, said molds each having a transverse bottom having a hole surrounded by a depending shell and having a second bottom below the first, the bottoms of a plurality of said molds being joined and constituting a platform, a water supply header, connections therewith delivering water through said platform to the bottoms of the molds, said platform being provided with packing on which rests the bottom edge of the walls of each mold, lugs on said walls, a transverse member within the mold coacting therewith, and a clamping bolt passing through said transverse member through the connection to that mold and through the supply header.

23. Ice making apparatus comprising in combination, a plurality of removable upright molds, freezing and thawing means for said molds, said molds each having a transverse bottom having a hole surrounded by a depending shell and having a second bottom below the first, the bottoms of a plurality of said molds being joined and constituting a platform, a water supply header, connections therewith delivering water through said platform to the bottoms of the molds, said platform being provided with packing on which rests the bottom edge of the walls of each mold, lugs on said walls, a transverse member within the mold coacting therewith, means for drawing down said transverse member, said means passing through said member through the connection to the individual mold and through the supply header, and a block faced with packing through which said means also passes located on the under side of the header to form a water-tight connection.

24. Ice making apparatus comprising in combination, a water supply, a feed water header in communication therewith, and upright freezing molds having individual auxiliary water tanks in their respective bottoms, each mold having an inlet in its individual auxiliary water tank and being in communication through said inlet with said header.

25. Ice making apparatus comprising in combination, a water supply, a feed water header in communication therewith, upright freezing molds each having a transverse bottom provided with a hole surrounded by an open ended shell depending from said bottom and having also a wall depending from said bottom and inclosing said shell to form an open-bottomed air trapping pocket below said transverse bottom between the depending shell and wall and having also a second bottom below the lower end of said depending shell and forming with said wall a water tank, and branch pipes connecting said header and tanks.

26. Ice making apparatus comprising in combination, a plurality of molds, and means for supplying water thereto, each mold having a transverse bottom provided with a hole surrounded by an open ended shell depending from said bottom and having also a wall depending from said bottom and inclosing said shell to form an open-bottomed air trapping pocket below said transverse bottom between the depending shell and wall and having also a second bottom below the lower end of said depending shell and forming with said wall a water tank.

27. Ice making apparatus comprising in combination, a plurality of freezing molds provided with freezing and thawing jackets and having interior freezing columns, headers for supplying and returning freezing and thawing fluid, and connections between said headers including in multiple the jacket and interior freezing column of an individual mold.

28. Ice making apparatus comprising a plurality of molds having bottoms, a plurality of water tanks with which said molds are in communication, and means for maintaining space between the water in said tanks and the mold bottoms.

29. Ice making apparatus comprising a plurality of molds provided with bottoms, a plurality of tanks for holding water beneath the bottoms of said molds and means for providing space for gas, as air, beneath said bottoms but above said water, said tanks being in communication with the interiors of said molds through said space.

30. Ice making apparatus comprising a plurality of molds provided with bottoms, a plurality of tanks for holding water beneath the bottoms of said molds, and means associated with the bottoms of said molds for placing their interiors in communication with said tanks, said means coöperating with said tanks to maintain water sealed space between the surface of the water and the bottoms of the molds.

31. Ice making apparatus comprising a mold having a bottom provided with a hole, means individual to said mold for holding water beneath the bottom of said mold with its surface separated from said bottom by space, and a pipe or shell passing from a point beneath the water level through said space to the bottom of said mold and surrounding said hole.

32. Ice making apparatus comprising, a plurality of molds, interior freezing columns within said molds, a plurality of water tanks with which said molds are in communication, means for maintaining space between the water in said tanks and the mold bottoms, and pipes in said space for serving said columns.

33. Ice making apparatus comprising in combination, a plurality of freezing molds, each of said molds having a transverse bottom provided with a hole surrounded by a depending pipe or shell and with a depending wall surrounding said pipe or shell, and a second bottom spaced from the first and constituting therewith and with said wall a water tank, and an outlet pipe leading from said tank at substantially the level at which water is to stand therein and extending up above the top of the mold to permit the escape of excess gas.

34. Ice making apparatus comprising in combination, a plurality of molds provided with bottoms, means for holding water beneath the bottoms of said molds, means for providing space for gas, as air, beneath said bottoms but above said water, said means for holding water being in communication with the interiors of said molds through said space, and a normally open outlet pipe leading from said space.

35. Ice making apparatus comprising molds having bottoms provided with holes, means for holding water beneath the bottoms of the molds with its surface separated therefrom by water sealed space, pipes or shells surrounding said holes passing from a point below the water level to the bottoms of the molds, and an outlet pipe leading from said space at a point above the bottom of said pipe or shell and extending up above the top of the molds to permit the escape of gas.

In testimony whereof I affix my signature in presence of two witnesses.

EDWARD T. WILLIAMS.

Witnesses:
JOHN L. FLETCHER,
T. S. SHNIRIE.